(12) United States Patent
Wright et al.

(10) Patent No.: US 10,155,595 B2
(45) Date of Patent: Dec. 18, 2018

(54) HOSE MANAGEMENT SYSTEM FOR SUPPLYING CONDITIONED AIR TO AN AIRCRAFT

(71) Applicant: Twist, Inc., Jamestown, OH (US)

(72) Inventors: Joe W. Wright, Xenia, OH (US); Frank Bair, New Carlisle, OH (US); Scott E. Schrinner, Jamestown, OH (US); Dave McIntire, Beavercreek, OH (US)

(73) Assignee: Twist, Inc., Jamestown, OH (US)

( * ) Notice: Subject to any disclaimer, the term of this patent is extended or adjusted under 35 U.S.C. 154(b) by 0 days.

(21) Appl. No.: 15/093,303

(22) Filed: Apr. 7, 2016

(65) Prior Publication Data
US 2016/0214739 A1 Jul. 28, 2016

Related U.S. Application Data

(62) Division of application No. 12/025,022, filed on Feb. 2, 2008, now Pat. No. 9,365,297.

(51) Int. Cl.
*B60H 1/00* (2006.01)
*B64F 1/36* (2017.01)

(52) U.S. Cl.
CPC ......... *B64F 1/364* (2013.01); *B60H 1/00264* (2013.01); *B64F 1/362* (2013.01); *Y02T 50/82* (2013.01)

(58) Field of Classification Search
CPC ...... B60H 1/00264; B64F 1/364; Y02T 50/82
USPC ........................................................ 454/119
See application file for complete search history.

(56) References Cited

U.S. PATENT DOCUMENTS

| | | | |
|---|---|---|---|
| 3,378,673 A | 4/1968 | Hopper | |
| 3,399,545 A * | 9/1968 | Anderson | B64F 1/305 138/106 |
| 4,151,864 A | 5/1979 | Thurman | |
| 4,223,702 A | 9/1980 | Cook | |
| 4,673,129 A * | 6/1987 | Kologiy | B05B 1/30 239/532 |
| 5,023,959 A | 6/1991 | Mercer | |
| 5,368,341 A | 11/1994 | Larson | |
| 5,715,701 A | 2/1998 | Kreymer | |
| 5,791,980 A | 8/1998 | Kramer, Jr. | |

(Continued)

FOREIGN PATENT DOCUMENTS

| | | |
|---|---|---|
| EP | 2504238 A1 | 10/2012 |
| WO | 2006136624 A1 | 12/2006 |
| WO | 2007104807 A1 | 9/2007 |

OTHER PUBLICATIONS

English Abstract of WO2007/104807 filed Sep. 20, 2007.

(Continued)

*Primary Examiner* — Helena Kosanovic
(74) *Attorney, Agent, or Firm* — Wood Herron & Evans LLP

(57) ABSTRACT

A hose management system with a longitudinally collapsible duct-like air hose may supply conditioned air for heating and/or cooling an aircraft. The system has a temperature controlled container and a motorized remotely controlled drive with treads for feeding out hose to a length appropriate to hook up to a stationary aircraft. The motorized drive also retracts the hose back into the container. The hose may have scuff strips, hook and loop fasteners, and reflective strips.

8 Claims, 17 Drawing Sheets

(56) References Cited

U.S. PATENT DOCUMENTS

| | | | |
|---|---|---|---|
| 6,443,830 B1 | 9/2002 | Vandamme | |
| 6,776,705 B2 * | 8/2004 | Bombardi | B64F 1/305 |
| | | | 137/355.16 |
| 6,802,769 B2 | 10/2004 | Grochowski | |
| 6,821,201 B2 * | 11/2004 | Bombardi | B64F 1/305 |
| | | | 454/119 |
| 6,834,668 B2 | 12/2004 | Bombardi et al. | |
| 9,365,297 B2 | 6/2016 | Wright et al. | |

OTHER PUBLICATIONS

European Search Report; EP Application No. 13 005 250.9-1754, dated Apr. 10, 2014.
European Search Report, EP Serial No. 09001424.2, dated Apr. 29, 2013.

* cited by examiner

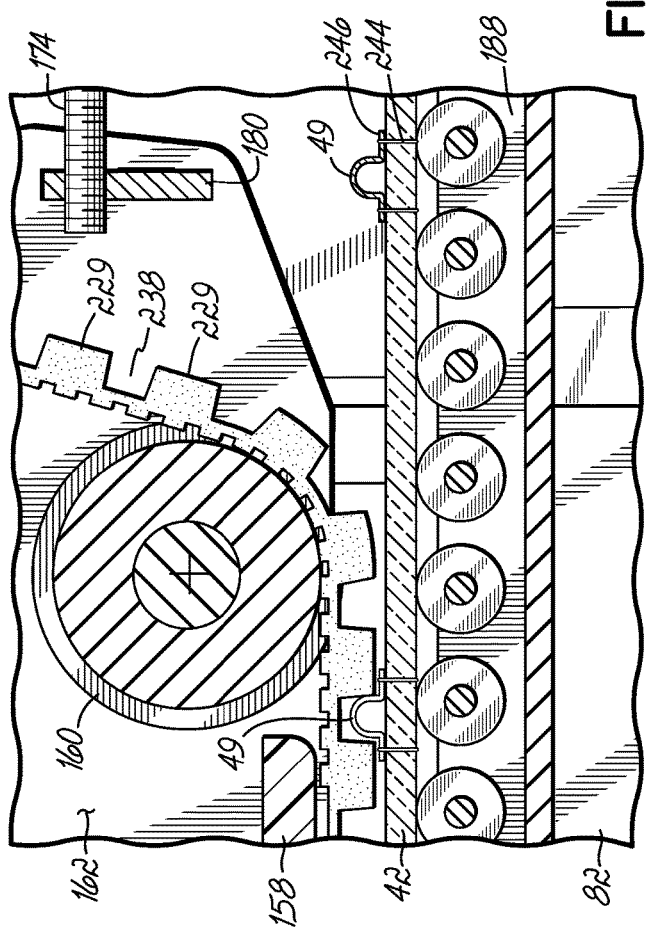
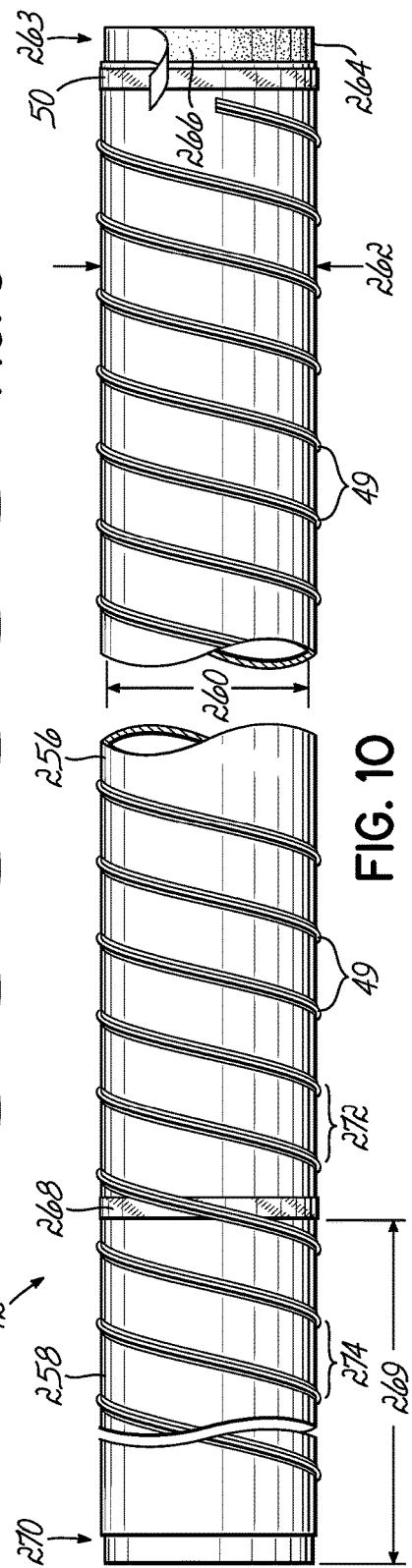
FIG. 8
FIG. 10

HOSE MANAGEMENT SYSTEM FOR SUPPLYING CONDITIONED AIR TO AN AIRCRAFT

RELATED APPLICATIONS

This application claims the benefit of U.S. application Ser. No. 12/025,022 filed on Feb. 2, 2008, the entirety of which is hereby incorporated by reference in this application as if fully set forth herein

FIELD OF THE INVENTION

The present invention generally relates to a device and a method for supplying conditioned air for heating and cooling an aircraft while it is stationary and on the ground. More specifically, the present invention extends and retracts a supply hose from a protective container, while one end of the hose is stationary and attached to the source of conditioned air.

BACKGROUND

It is generally known to supply commercial aircraft with conditioned air for heating and cooling. Typically, conditioned air is supplied to the aircraft from a ducting system associated with the telescoping corridor that is a part of the airport terminal. The air is delivered from the telescoping corridor to the aircraft with a flexible and usually insulated air hose. The hose is typically one hundred feet in length or more. When not in use, the hose is stored in a bin under the terminal. Occasionally, when time permits, a worker may roll the hose into a roll before storing the hose in the bin. Often, an individual leaves the hose bent upon itself in the bin, thereby increasing undue wear of the hose and predisposing the hose to kink when in use. Kinks are undesirable because they decrease the amount of air delivered through the hose. The process of hefting the hose into and out of the bin can cause snagging and tearing of the hose, further decreasing delivered air. Lifting and moving the hose is ergonomically difficult.

In addition, while all aircraft have a standard connector, this connector is not located at the same point on all aircraft. Further, the telescoping corridor is not always located at the same distance from the aircraft. Some aircraft require one hundred feet or more of supply hose for the conditioned air to reach the aircraft, while others may only require twenty feet. All one hundred feet of the supply hose must be removed from the bin regardless of how much hose is required. Whenever less than the full length of the hose is required, the hose will likely be bent and kinked between the terminal and aircraft. A bent and/or kinked hose reduces the airflow to the aircraft when compared to a smoothly routed hose. Reduced airflow reduces the delivered heating and cooling. In some cases, the aircraft cannot be adequately heated or cooled using air supplied by the ground facility through the bent or kinked hose, and the aircraft may then need to operate its auxiliary power unit (APU). The APU consumes jet fuel and increases the airline's costs.

In addition, another safety issue is that having more hose than necessary on the tarmac can cause a tripping hazard and make it more difficult for the ground operation crews to safely maneuver their vehicles.

A need, therefore, was previously recognized for an improved device and a method for supplying conditioned air for heating and/or cooling a commercial aircraft. U.S. Pat. Nos. 6,821,201, 6,776,705, and 6,834,668 to Bombardi et al. are directed to this improvement. Bombardi supplies a protective container that dispenses an appropriate length of hose, and retracts the hose when the hose is no longer needed. However, the device disclosed by the Bombardi patents has several aspects that can be improved upon to increase reliability, functionality, and ease-of-use.

SUMMARY OF THE INVENTION

In retractable hose device such as described by Bombardi, the power required by the dispensing and retracting device to reliably do its job varies with the length of the hose installed in the device. For example, a long hose, due to weight and drag, requires a different level of energy to retract it than does a short hose. Therefore, according to one aspect of the invention, torque sensing circuitry that is adjustable according to the hose installed is provided in the hose retractor.

The ability to retract a hose also depends upon how pliable it is, and pliability varies according to temperature. A cold hose is less pliable, and therefore harder to compact into its container. Also, a cold hose causes the heated air being supplied to the aircraft to arrive in a cold condition, until the mass of the hose is warmed by the flowing air. Therefore, according to a further aspect of the invention, a heater is included within a hose retractor container, keeping the stored hose warm, even during cold weather. Alternatively or additionally, a heat exchanging element may be provided to either cool or heat the container.

The person responsible for deploying and attaching the hose is often under time constraints and needs to work efficiently. The person could benefit from a remote control, such as one mounted on their belt or work uniform, or one mounted to the hose connector. Another aspect of the present invention therefore features a remote control for controlling the device to extend and retract the hose, and to turn the supply of air on and off. The remote further features an auto-retract mode, allowing ground crew to walk away to another next task while the unattended hose is returning to the container, increasing efficiency beyond what is available with existing systems.

Additional aspects of the invention that improve upon previous devices include a variable speed control, a re-engineered drive mechanism that uses fewer motors and allows easier maintenance than that described by Bombardi, an aviary (bird) deterrent, increased hose-length capacity, an improved hose, and improved removable mounting system for use at the airport facility.

Although these devices are specifically described in relation to servicing aircraft, the principles of this invention could also be used in other applications where hoses must be stored, extended and retracted. Examples of such applications include supplying air to utility workers working beneath a roadway or in a confined space, and the storing of a sanitary waste dump hose attached to a waste tank in a recreational camping vehicle.

Additional features and advantages of the present invention are described in, and will be apparent from, the detailed description of the presently preferred embodiments and from the drawings.

BRIEF DESCRIPTION OF THE DRAWINGS

The accompanying drawings, which are incorporated in and constitute a part of this specification, illustrate embodiments of the invention and, together with the general description of the invention given above, and the detailed description given below, serve to explain the principles of the invention.

FIG. 8 illustrates a detail cross-sectional view of a portion of FIG. 7.

FIG. 10 illustrates a diagrammatic view of a hose of the embodiment in FIG. 1A.

DETAILED DESCRIPTION

Figure 1:
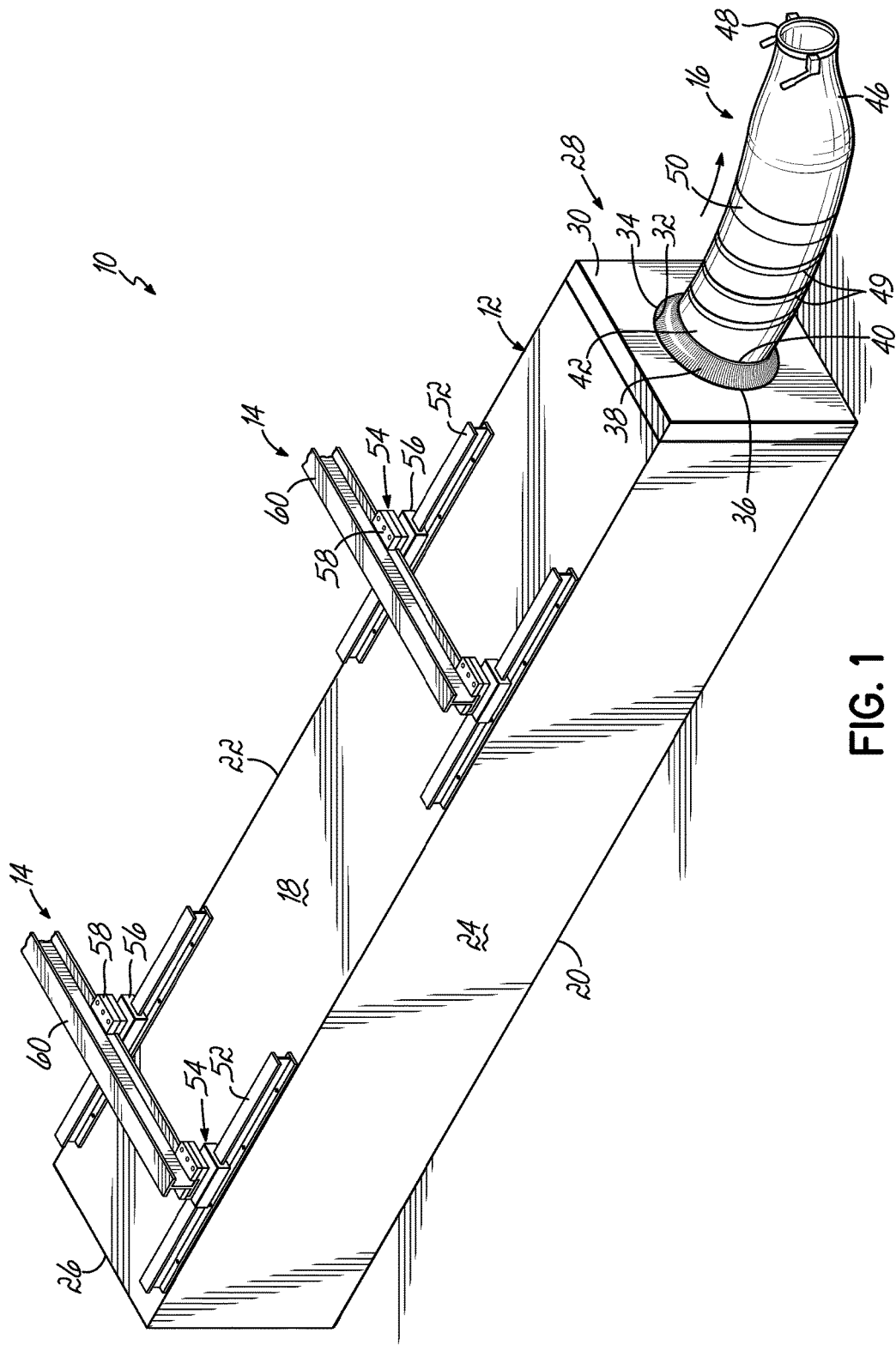
FIG. 1 is a perspective view illustrating an embodiment of the present invention. A mounting system is also shown.

FIG. 1 illustrates a hose management system 10 comprised of a container 12, a mounting system 14, and an air conduit 16. The container 12 has a top 18, a bottom 20, a left side 22, a right side 24, an inlet end 26 and an outlet end 28. For purposes of this description, the direction referred to as forward or front will be towards the outlet end 28, and the direction referred to as back or aft will be towards the inlet end. A nose cover 30 is on the outlet end. The nose cover has an aperture 32 having a perimeter 34. An aviary deterrent 36 is fastened around the perimeter of the aperture. The aviary deterrent comprises bristles 38 that extend from the perimeter to form an inner aperture 40 through which the air conduit 16 passes. The air conduit comprises a hose 42, a reducer 46, and a coupling 48. The hose has an evenly spaced scuff strip 49 and a reflective strip 50. An air inlet 51 (FIG. 2A) is at the inlet end 26 of the container 12. The mounting system 14 comprises a mount beam 52, a mount connector 54 comprised of a lower connector 56 and an upper connector 58, and a top beam 60. The top beam may be provided as part of the hose management system 10, or it may already be a part of a facility. An example of a facility is a telescoping corridor used to load passengers into an aircraft. The lower connector 56 connects to the mount beam 52 and the upper connector 58 connects to the top beam 60.

Figure 1A:
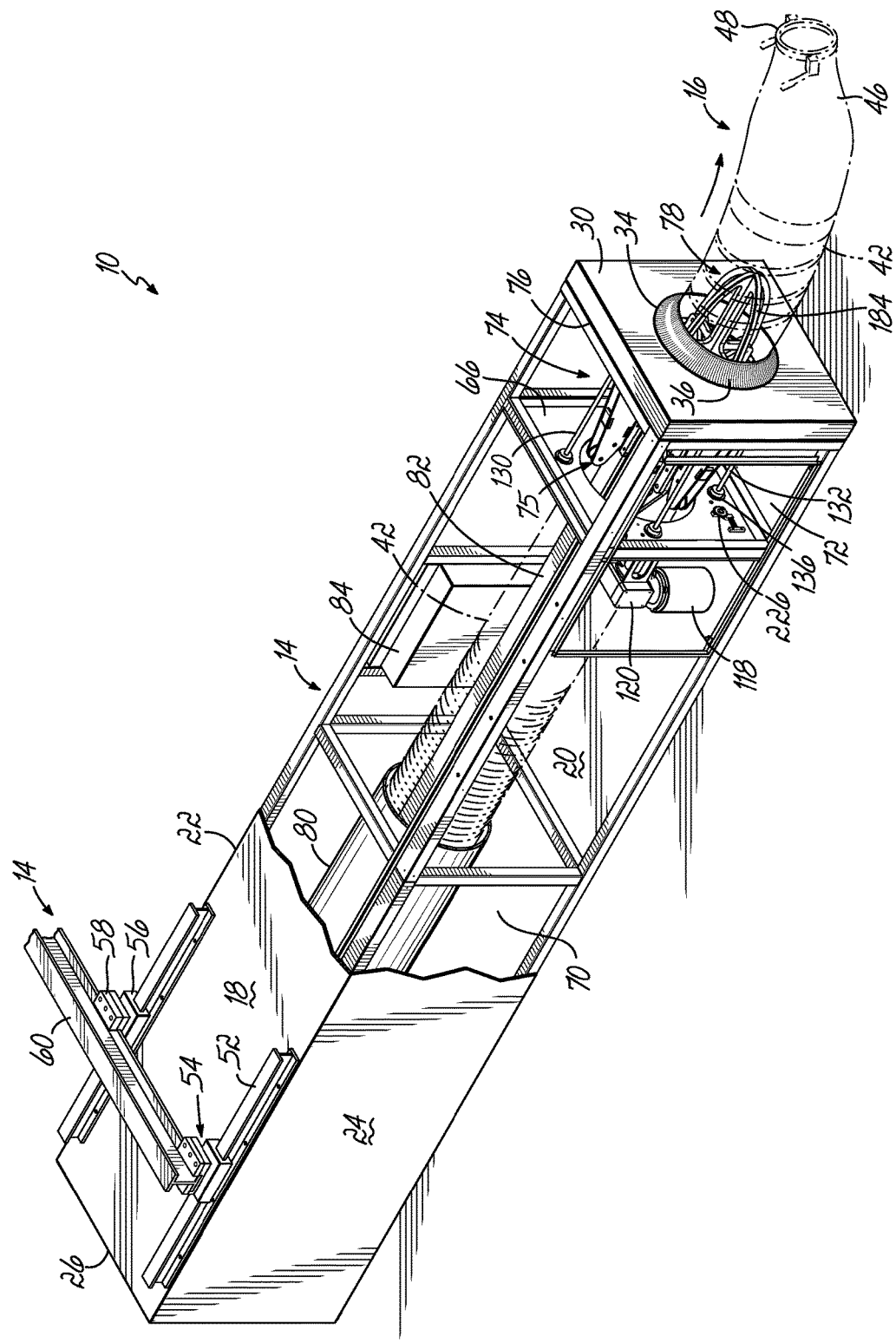
FIG. 1A illustrates the embodiment of FIG. 1 in partial cross-section with the hose illustrated with phantom lines.

With regard to FIG. 1A, the hose management system 10 is illustrated with the container 12 in partial section view and the air conduit 16 represented with phantom lines. The container 12 comprises a frame 62 covered with a skin 64 (shown partially removed for clarity) of material such as sheet metal. A middle cap plate 66 separates a larger rear compartment 70 from a smaller front compartment 72. The front compartment has a drive assembly 74 having four-belt drives 75 and a front cap 76 that is aft of the nose cover 30. A mandrel 78 extends through the front cap 76, and the inner aperture 40. An entrapment tube 80 and a support beam 82 are in the rear compartment. In FIG. 1A, the entrapment tube 80 is partially removed for clarity. The entrapment tube 80 may be one long length, or it may be made of shorter sections fastened together. Also illustrated is a control unit 84 that will be discussed later.

Figure 2A:
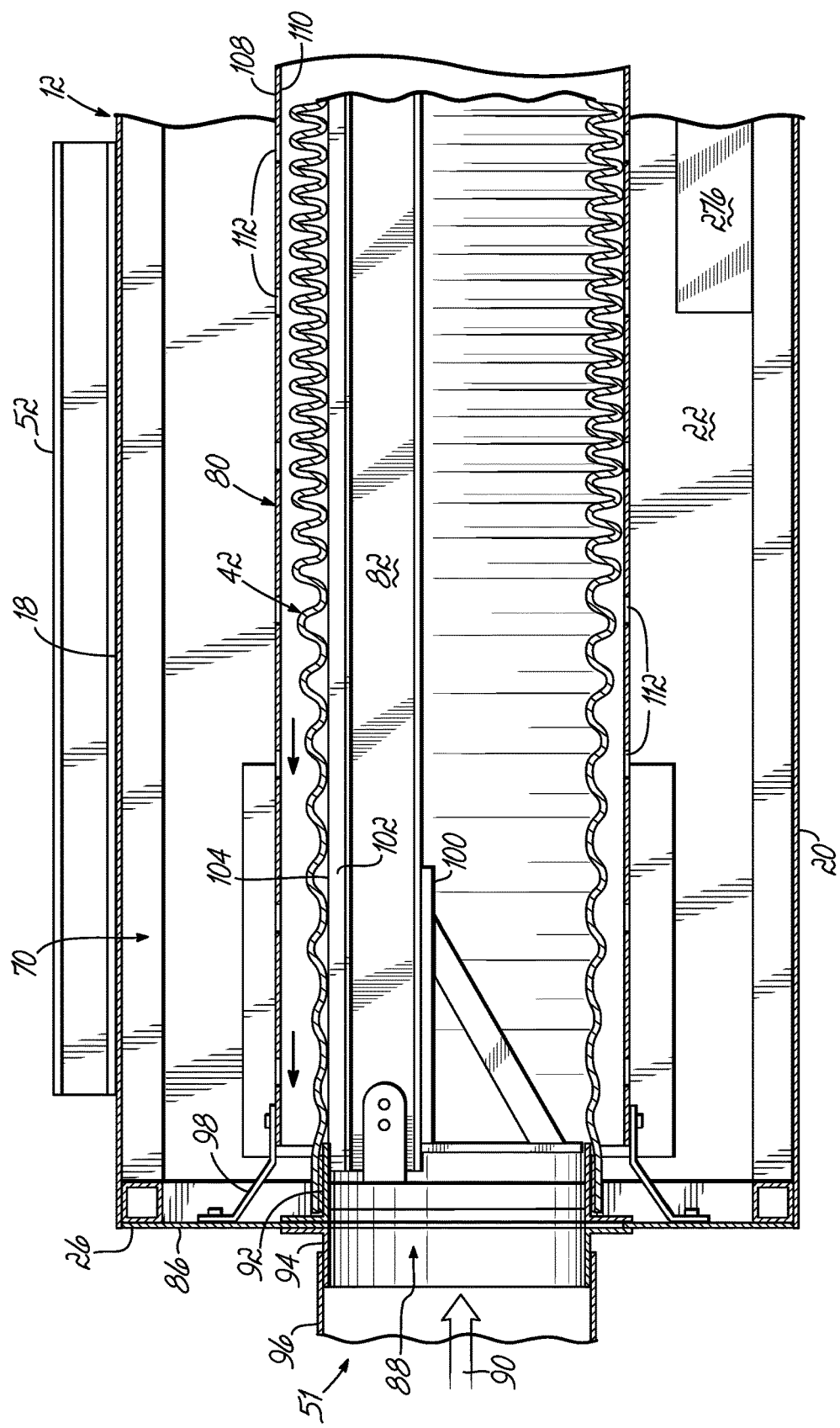
FIG. 2A illustrates a side elevational cross-section view of a portion of the embodiment of FIG. 1 while the hose is beginning to be retracted.

With regards to FIG. 2A, the inlet end 26 has a rear cap 86 with an aperture 88 through which conditioned air 90 can flow as indicated by the arrow. Surrounding the aperture is an inner boot 92 and an outer boot 94. The outer boot 94 connects with a facility air supply 96. The inner boot 92 connects with the hose 42. The hose 42 passes through the entrapment tube 80 which is held to the rear cap 86 by entrapment mount brackets 98. A beam adjuster 100 and a beam cap 102 fasten to the support beam 82. The beam cap 102 is on top of the support beam 82 and has a smooth surface 104 in contact with the hose 42. It is contemplated that the beam cap 102 could be eliminated, with the use of a support beam 82 that provides a smooth surface on which the hose could glide. The support beam carries the weight of the hose. The weight varies depending upon the hose installed, as well as the length of the hose extended or retracted. The beam adjuster 100 underneath the support beam 82 is used to position the support beam, according to the weight of the hose 42 installed. Some hose management systems may have a hose of maximum length and durability, while others may be ordered with shorter and lighter hoses.

FIG. 2A illustrates the hose being retracted by the drive assembly 74 and pushed along the beam cap 102 as indicated by the two solid arrows. As additional hose is pushed into the entrapment tube 80, the hose compacts while maintaining an essentially round cross-section. The entrapment tube has an outside surface 108 and an inside surface 110. Perforations 112 in the entrapment tube allow air within the container to circulate and reach the hose. By heating or cooling the air in the container 12, any hose in the container is also heated or cooled. The inside surface 110 contacts the hose, creating drag so that the hose will more closely and uniformly compact along the support beam 82. A further purpose of the entrapment tube is to ensure the hose remains straight and unkinked within the container. The support beam alone, being substantially less in width than the diameter of the hose 42, may not adequately prevent side to side or upwards movement of the hose 42 as air flows through it. Such movement may lead to kinking.

Figure 2B:
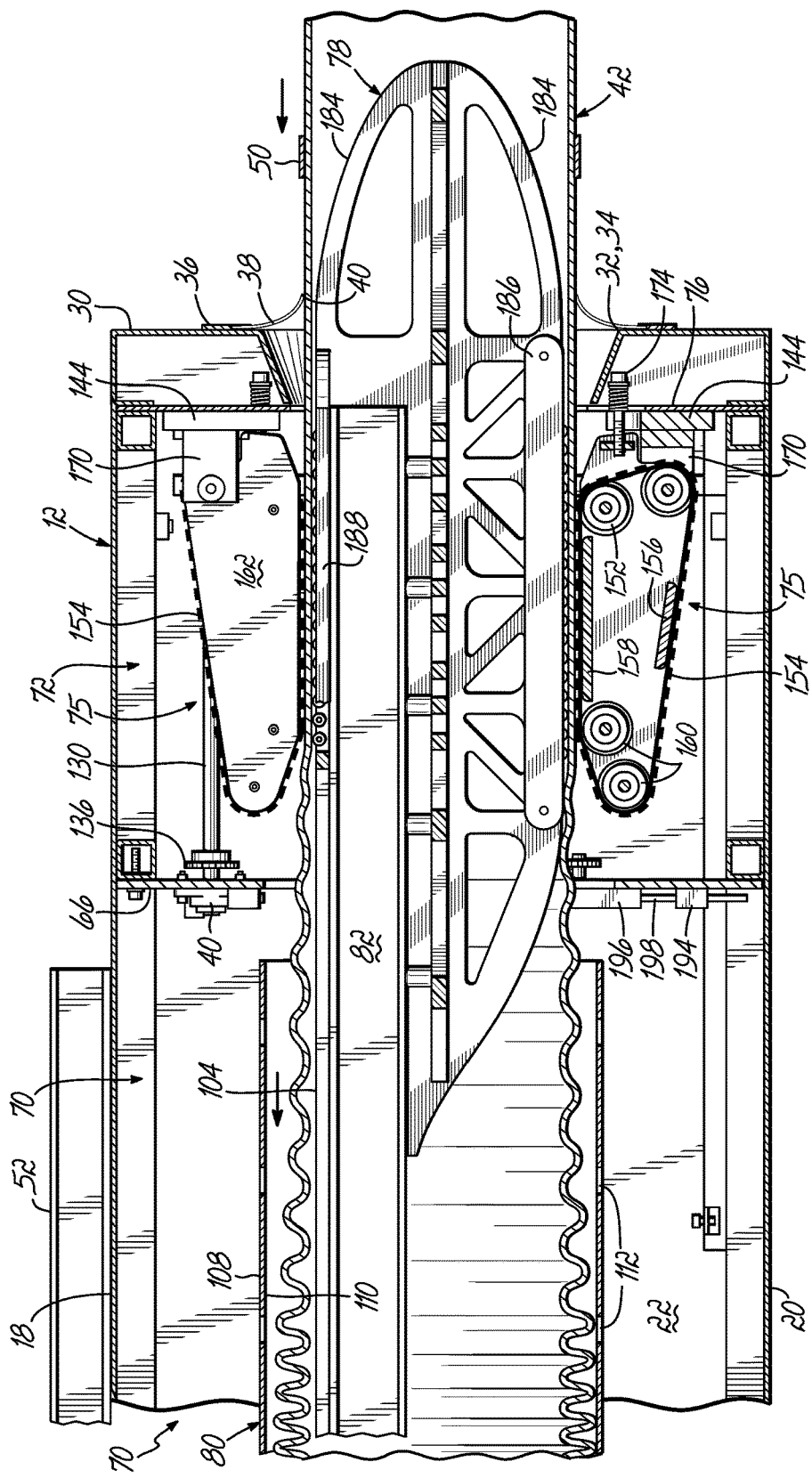
FIG. 2B illustrates a side elevational partial cross-section view of a second portion of the embodiment of FIG. 1.
Figure 3:
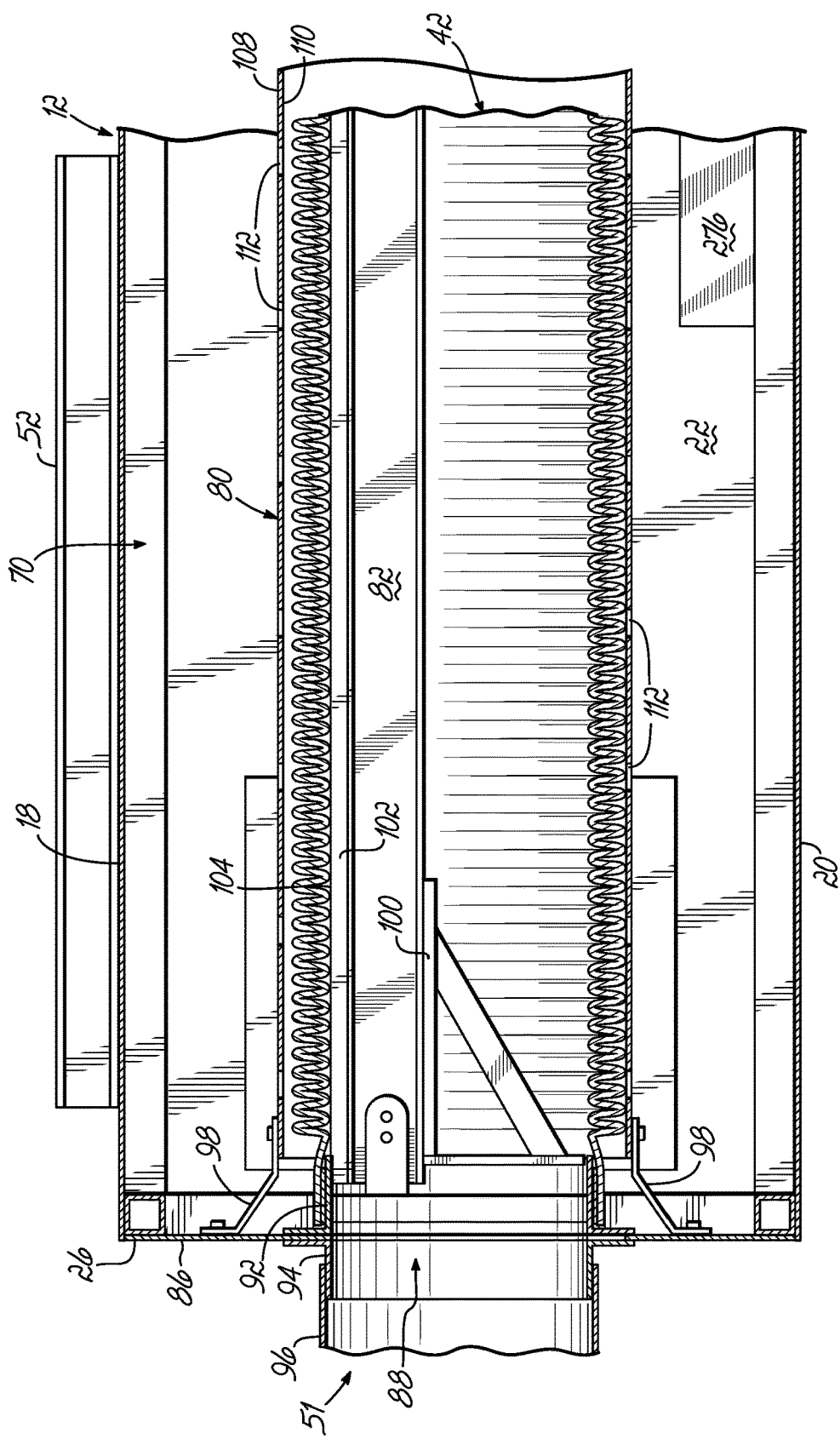
FIG. 3 illustrates a cross-sectional view of the portion as in FIG. 2A after the hose is additionally retracted.

FIG. 2B is the forward continuation of FIG. 2A. The hose is retracted into the container across the mandrel 78 and starts to compact in the entrapment tube. The hose is retracted into the container until the reflective strip 50 reaches an optical sensor 116 (FIG. 4) inside the container that signals the control unit 84 to stop the drive assembly 74. If the hose is of maximum length, it will be fully compacted (FIG. 3). A hose of a lesser length may be less tightly compacted than illustrated.

Figure 7:
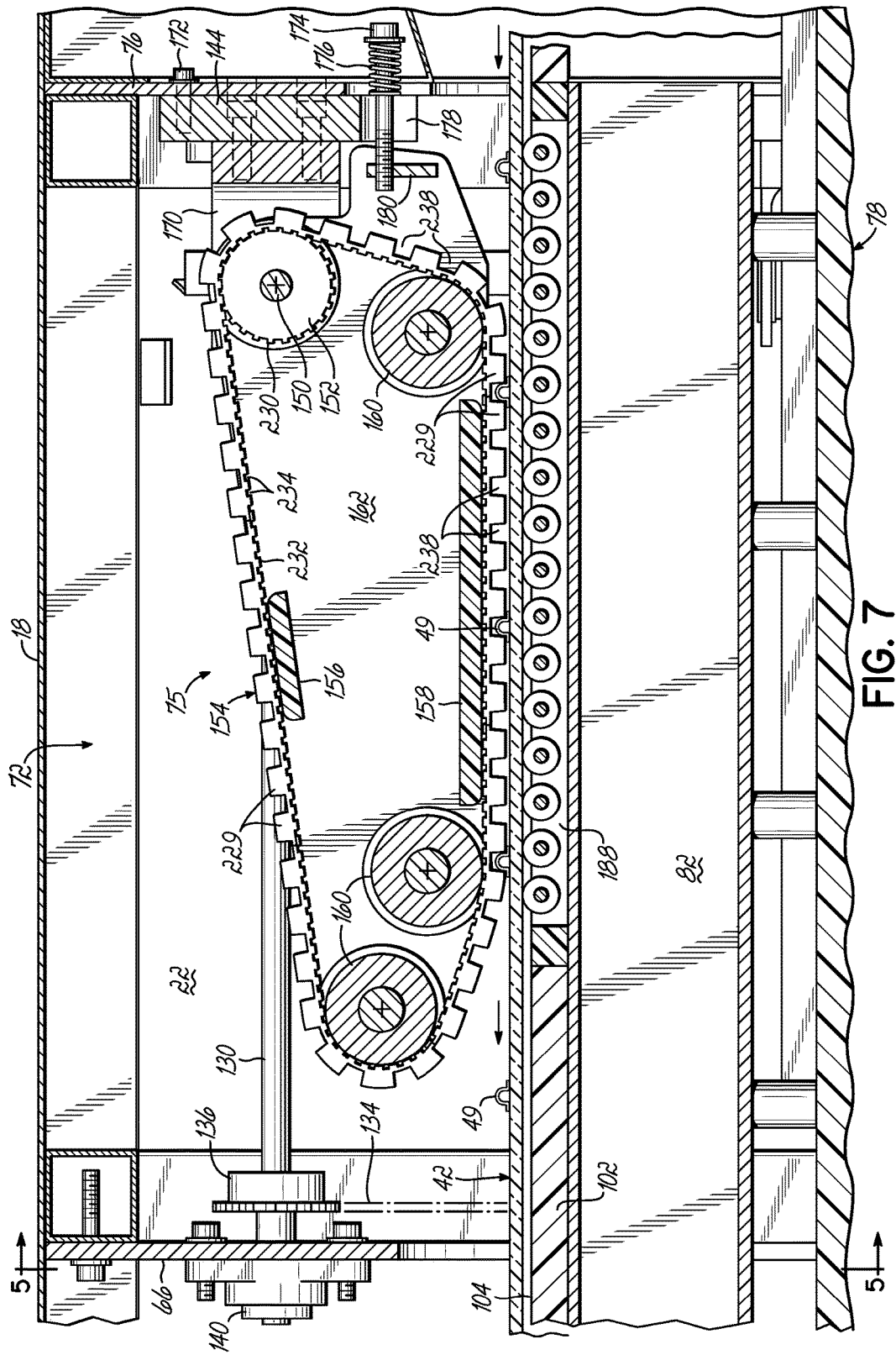
FIG. 7 illustrates a detail cross-sectional view of a portion of FIG. 2B with details of the belt drive shown.

The drive assembly 74 will now be further explained with reference to FIGS. 2B, 4, 5, 6, 7, and 9. A motor 118 mounted on a gearbox 120 fastened to the mid cap plate by gearbox mount brackets 122 drives the drive assembly. Power from the motor is transmitted through a shaft coupler 124 to a main drive shaft 126. The main drive shaft is coupled to two secondary drive shafts 128, 130, and one manual drive shaft 132 (FIG. 5) by a roller chain 134 that passes over a chain sprocket 136 on each of the four drive shafts (126,128,130,132). The manual drive shaft differs from the secondary drive shafts in that the manual drive shaft extends further into the rear compartment and can be accessed through the left side of the container when a need to manually operate the hose management system arises. Manually, as used herein, also includes using a powered tool to rotate the manual drive shaft. The four shafts 126, 128, 130, 132 are supported on their aft end by aft flange bearings 140 on the middle cap plate 66 (FIG. 7). The forward ends of the shafts 126, 128, 130, 132 are supported by forward flange bearings 142 on belt drive bases 144 fastened to the front cap 76. The main drive shaft drives the secondary and manual drive shafts, so that a driving miter gear 146 on each shaft drives a driven miter gear 148. The driven miter gear is on a pulley shaft 150 having a belt pulley 152 that drives a belt 154 (FIG. 7) on the belt drive 75. The belt passes across a small belt support 156, a large belt support 158, and around three idler pulleys 160. The belt pulley, idler pulleys, and belt supports are between two side plates 162, 164 that are supported by a shaft bearing 168 at a pivot mount 170 that is mounted to the belt drive. The belt drive base 144 is fastened to the front cap 76 by fasteners 172. Additionally, the belt drive is held to the front cap by a shoulder bolt 174 that passes through a tension spring 176, a slotted hole 178 in the belt drive base, and a spring block 180. The spring block is threaded to engage the threads of the shoulder bolt. The belt drive, mounted pivotally and pulled by the tension spring and the shoulder bolt, applies pressure to the hose. However, the belt drive is free to allow irregularities in the hose, or foreign objects the hose may pick up, to pass beyond the belt without causing a jam. Additionally, if the shoulder bolt is removed, the belt drive may be pivoted away from the hose for additional maintenance access.

Inside the hose and not normally visible is the mandrel 78 having four guide surfaces 184 and three roller tracks 186 and one top roller track 188 in line with the four belt drives 75. The support beam 82 mounts to the mandrel underneath the top roller track and extends aft through the entrapment tube. The beam cap 102, mounts on top of the support beam aft of the top roller track.

Figure 5:
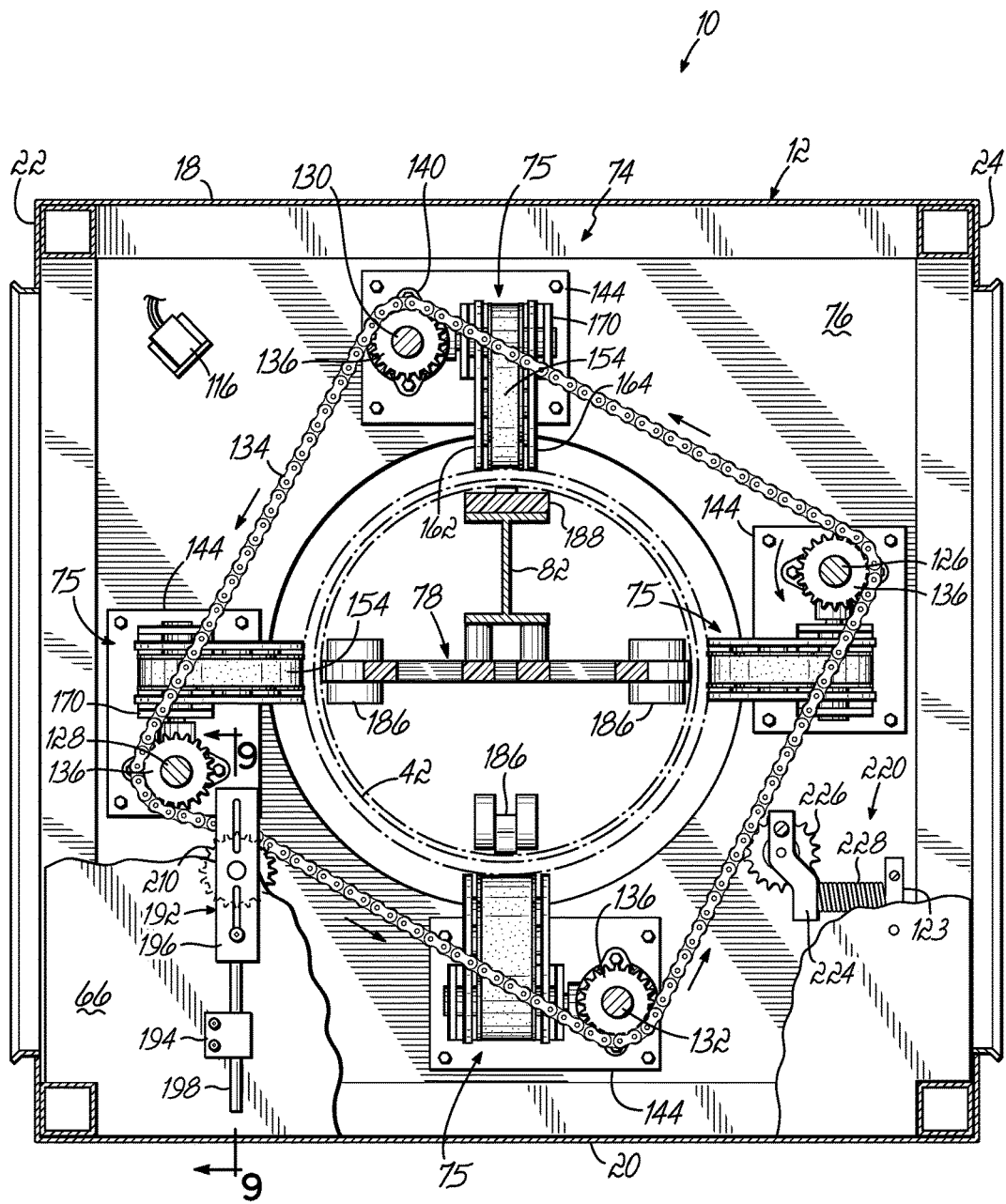
FIG. 5 illustrates a cross-sectional view as shown per the numbered arrows in FIG. 7, with much of the middle cap plate removed for clarity.
Figure 6:
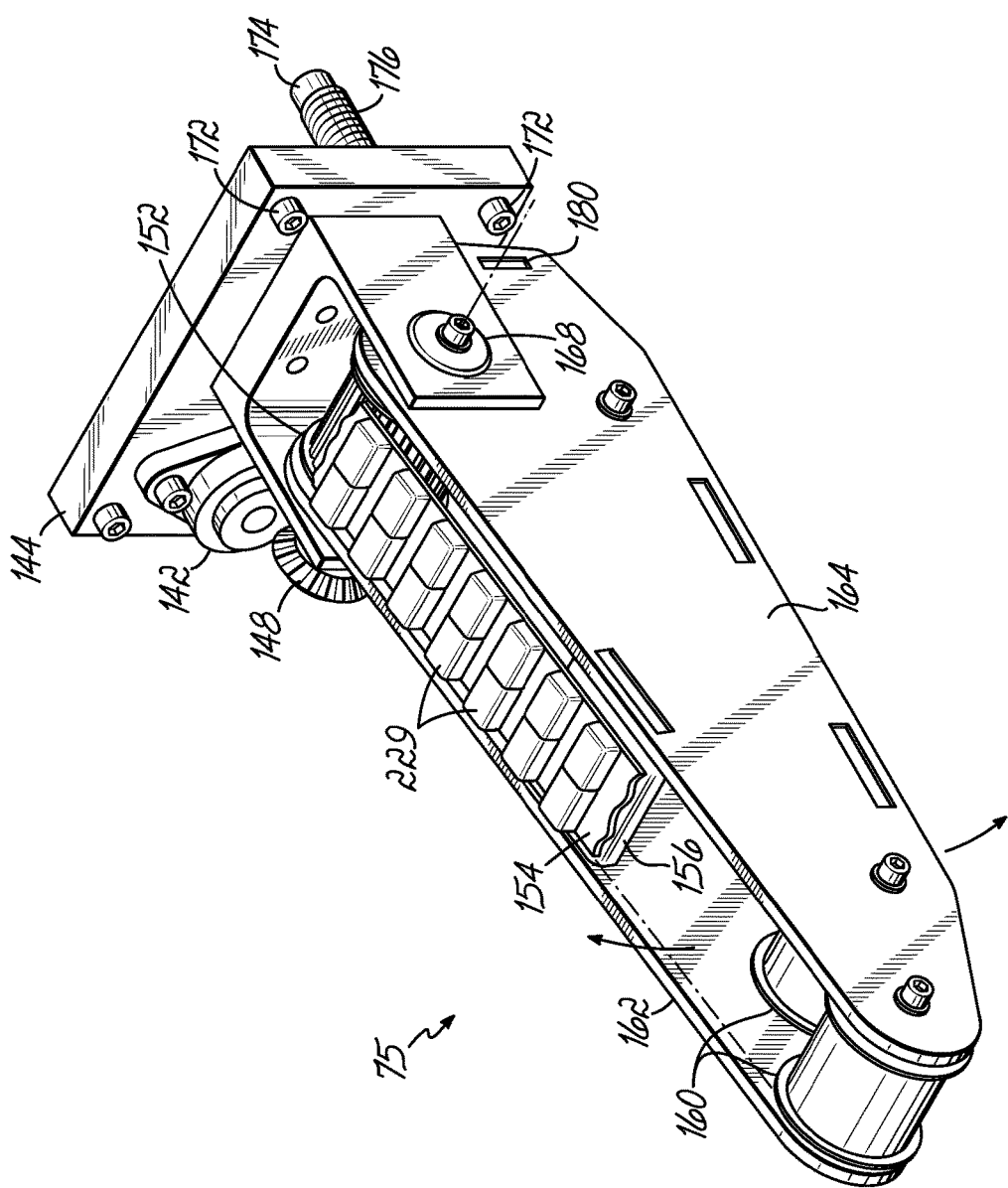
FIG. 6 illustrates a perspective view of one belt drive assembly of FIG. 4 with a portion of a belt.
Figure 9:
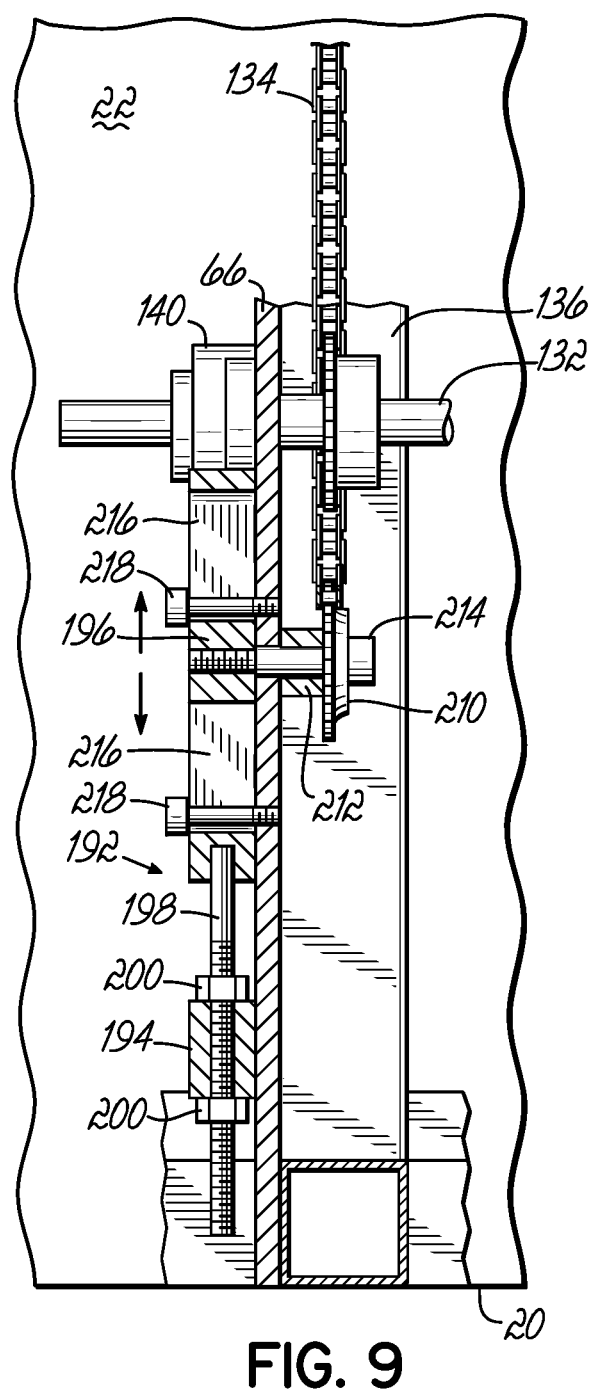
FIG. 9 illustrates a cross-sectional view of the chain adjuster as shown per the numbered arrows in FIG. 5.

The drive assembly additionally comprises a chain adjuster 192 best seen in FIG. 5, and detailed in FIG. 9. FIG. 5 is a view from the aft of the middle cap plate 66, looking forward into the forward compartment. The chain adjuster 192 comprises an adjuster block 194, a tensioner block 196, a rod 198 going between the adjuster block and the tensioner block, two nuts 200, an idler sprocket 210, an idler spacer 212, and a shoulder bolt 214. The tensioner block has two elongated holes 216 through which two bolts 218 pass and adjustably fasten the tensioner block to the mid-cap plate. By adjusting the nuts on the rod, and pushing the tensioner block away from the adjuster block while the two bolts are loosened, the idler sprocket lengthens the path of the roller chain. Then the two bolts are tightened. This adjustment is performed during chain installation and maintenance.

A chain tensioner 220 (FIG. 4) having a stationary block 222, a pivoting block 224, an idler sprocket 226, and a spring 228 is fastened to the middle cap plate 66. The spring bias pivots the idler sprocket into the chain to dynamically maintain tension in the chain.

FIG. 7 illustrates the positive drive between a tread 229 on the belt and the scuff strip 49 on the hose 42. As cogs 230 on the belt pulley contact the belt interior 232 and positively move the belt by interfacing with the notches 234, the tread 229 interlocks with the scuff strip. The dimensional spacing between the treads and the dimensional spacing between the scuff strips are coordinated so that a space 238 between the treads will cooperate with the scuff strip. The scuff strip is spirally-wound and is therefore not perpendicular to the axis of the hose. Therefore, a two inch circumferential length of the scuff strip corresponding to the two inch wide belt covers slightly more longitudinal length of hose than the width of the scuff strip. This longitudinal length is taken into account when calculating the dimensional spacing of the tread on the belt. A preferred match is to put the scuff strip, having a width of 0.340 inches at a pitch of 7 inches, while placing the tread at a pitch of 1.181 inches. The tread is approximately 0.750 inches wide.

Stitches 244 securing the flange 246 of the scuff strip to the hose are shown in FIG. 8. These stitches pass through the entire wall of the hose. Other systems for attaching the scuff strip to the hose, or for creating a plurality of protrusions either spirally or longitudinally spaced along the hose, are also within the scope of this invention. Future protrusions need not be in the form of a scuff strip.

Figure 11A:
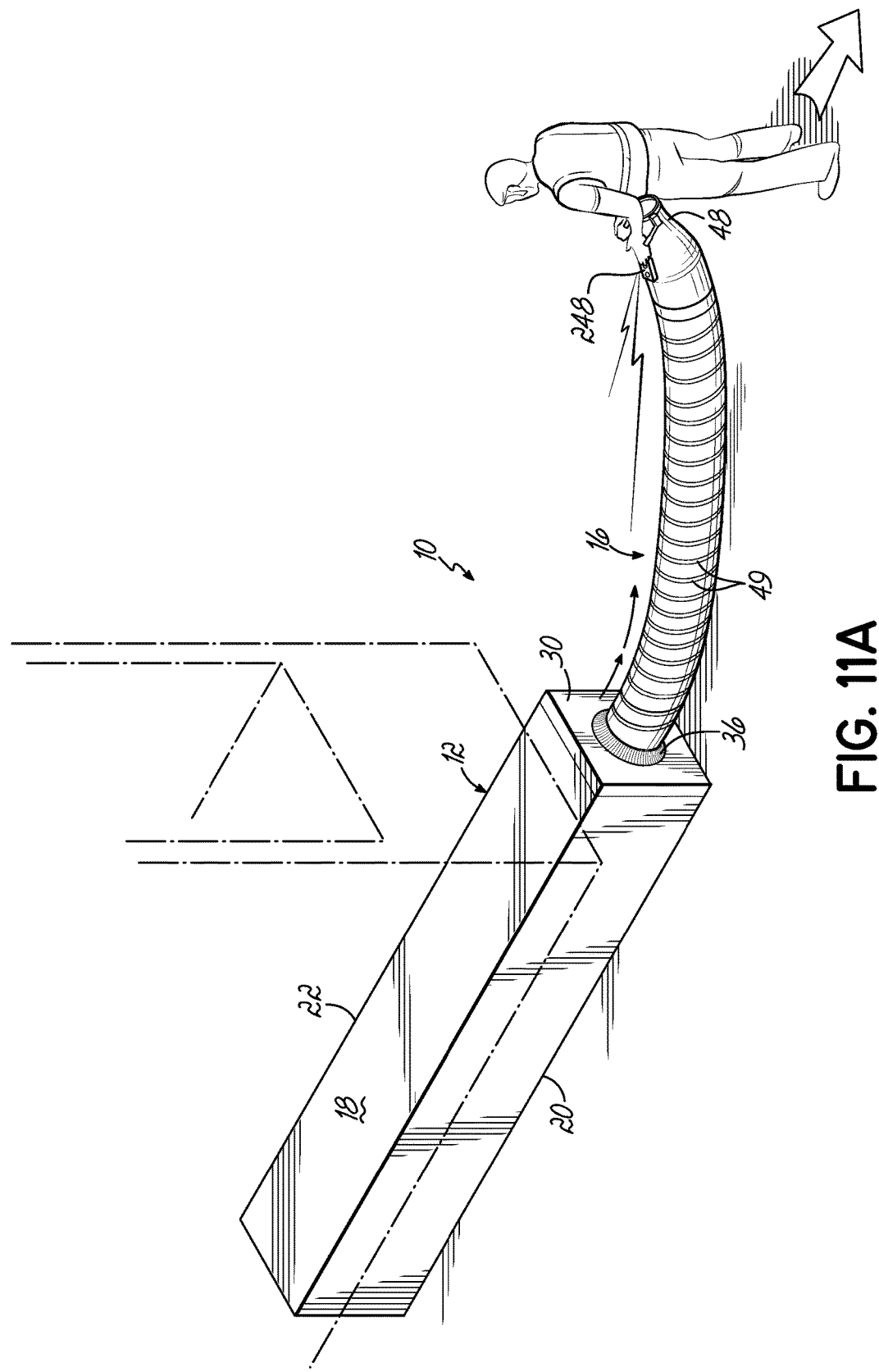
FIG. 11A illustrates a perspective view of an operator using the embodiment of FIG. 1 to extend a hose.
Figure 11B:
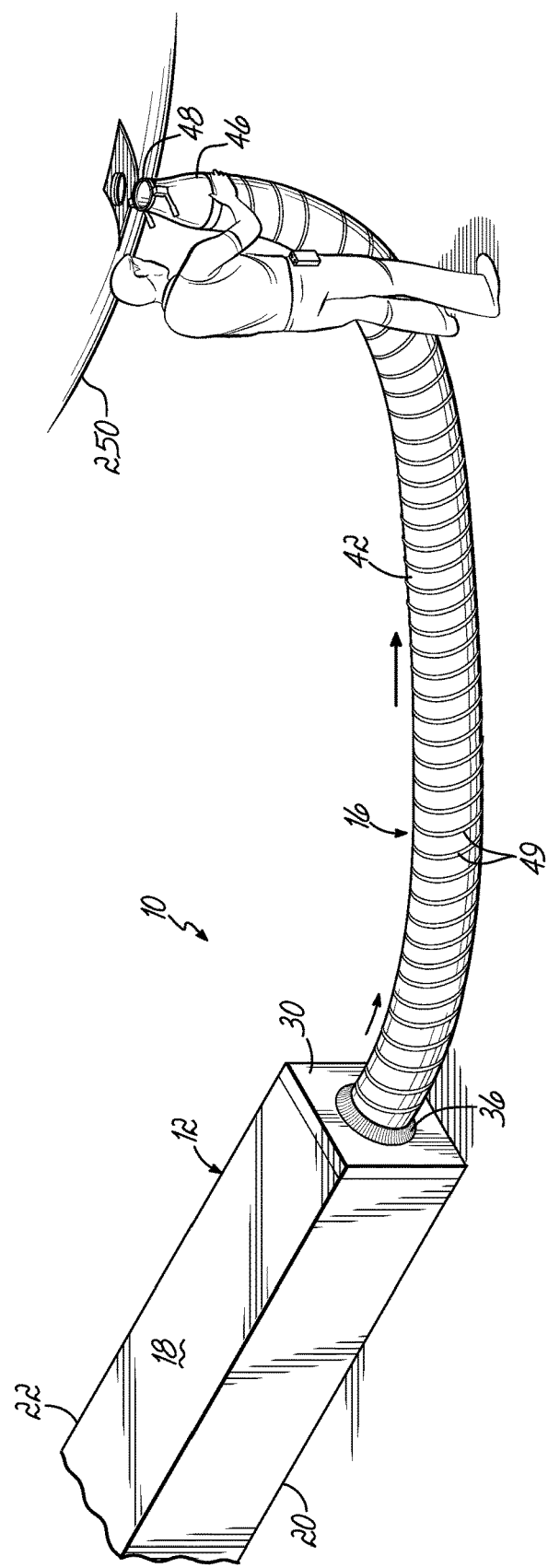
FIG. 11B illustrates a perspective view of an operator using the embodiment of FIG. 1 to attach a hose to an aircraft.
Figure 11C:
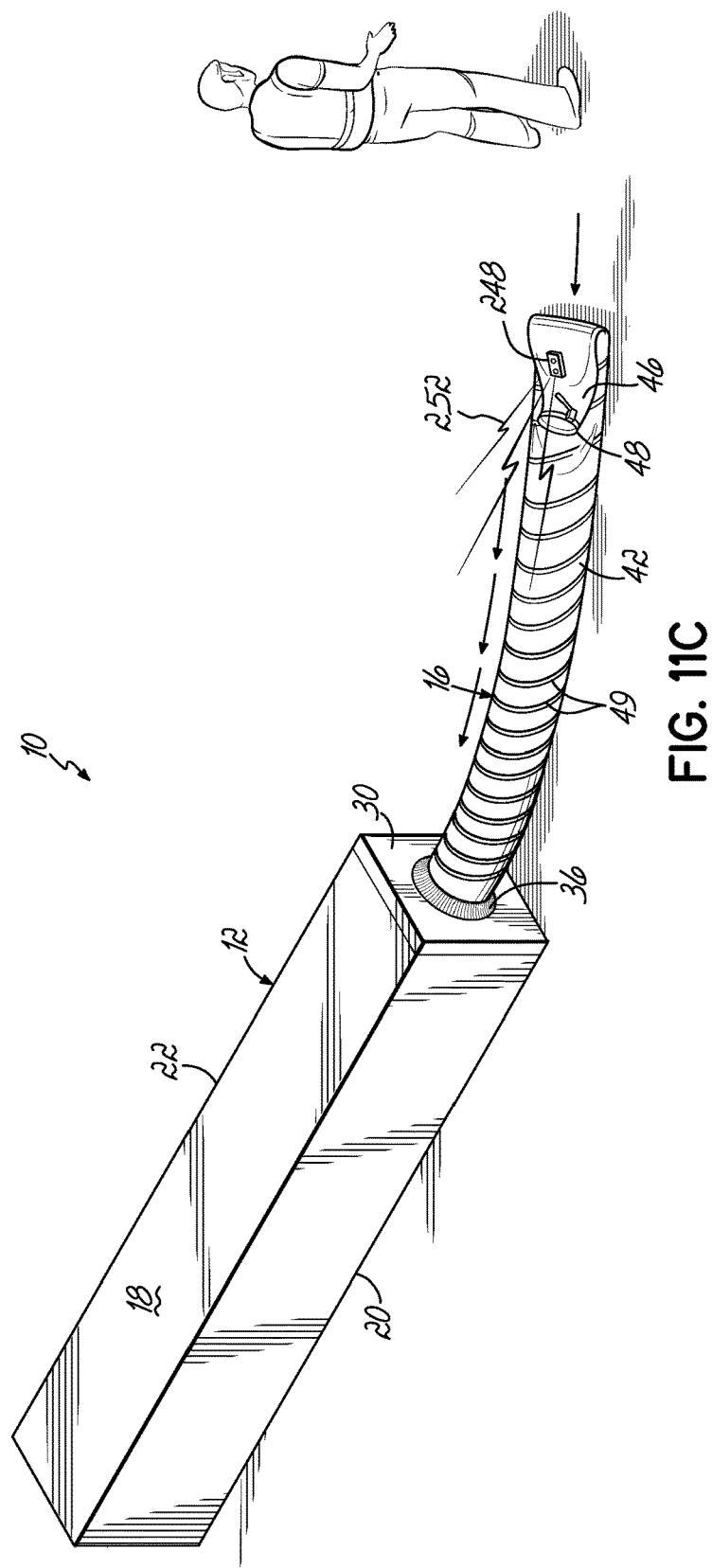
FIG. 11C illustrates a perspective view of an operator using the embodiment of FIG. 1 to retract a hose.

Operation of the hose management system is shown in FIGS. 11A, 11B, and 11C. In FIG. 11A, an operator using a remote control 248 secured in the vicinity of the reducer portion 46 is using the hose management system to feed out the hose as he walks toward the aircraft 250. In the event the operator attempts to feed out more hose than the hose management system can provide, safeguards are present and described along with the hose description below. In FIG. 11B, the operator, having fed out enough hose, attaches the connector to the aircraft. In FIG. 11C, when the conditioned air is no longer needed at the aircraft the operator uses the remote control to send a signal 252 to the hose management system to retract the hose into the container. The hose will retract until the reflective strip 50 reaches the optical sensor 116 inside the container, signaling the hose management system to stop retracting. The operator is free to pursue other tasks, and does not have to accompany the hose during retraction.

Alternatively, the remote, rather than being on the hose and uniquely programmed to the particular hose management system, may be a multiple purpose remote 254 (not shown) carried by the operator. Such a remote would use unique signals to activate the appropriate hose management system among several at the airport. Alternatively, the remote may be mated to a single hose management system, but may include additional controls for other controllable systems in the gate area, such as the HVAC system, the HVAC blower, the controls for the motorized telescoping corridor, lights, and any other controllable or indicator systems used by aircraft, flight crews and ground personnel.

FIG. 10 illustrates a hose configured for use with the hose management system. The hose comprises a first portion 256 of nominal 14-inch inside diameter lay-flat hose made of a nylon layer on the inside and a nylon layer on the outside with insulation between the two nylon layers. Yellow nylon layers are preferred for visibility. The hose further comprises a second portion 258 of hose that need not be insulated. The inside diameter dimension 260 of the hose is consistent with the mandrel 78 diameter and the distance across opposing roller tracks 186, 188. An outside diameter dimension 262 of the hose is consistent with the spacing between opposing belt drives. The first reflective strip 50 is at a first end 263 of the hose near a cuff 264 having hook fasteners 266, to which the reducer portion 46 may be attached. Preferably the cuff is eight inches in length and four inches of it has hook fasteners.

A second reflective strip 268 is at a distance 269 from a second end 270 of the hose. In operation, the second reflective strip 268 is sensed by a second optical sensor 271 (FIG. 4) to stop the drive assembly from feeding out additional hose when none remains compacted on the support beam. Distance 269 approximately corresponds to the length of the rear compartment, and is the anticipated length necessary to contain hoses to service foreseen aircraft and airport combinations. The length and functional diameter of a hose management system design may be scaled to suit additional lengths and diameters of hose.

Between the two reflective strips, approximately equivalent to the first portion, the scuff strip has a first scuff strip pitch 272 that cooperates with the pitch of the belt. In a preferred embodiment, the pitch of the scuff strip is seven inches.

The second portion 258 has a second scuff strip pitch 274 that does not cooperate with the pitch on the belt. This different pitch acts as a backup so that in the event the second reflective strip 268 does not stop the extending of hose from the container, the difference in pitches will prevent significant pulling on the hose. Preferably, the second portion is a non-lay-flat style hose that maintains its shape while hanging from the support beam. Further, the second portion of the hose need not be insulated since it does not leave the container and is not exposed to outside ambient air. Non-insulated hose saves space as compared to insulated hose.

FIG. 2A shows a heat-control element 276 used to maintain the temperature of the air in the front compartment and rear compartment. Controlling the temperature of the air maintains the hose at a temperature that is most beneficial for pliable compacting and extension. A heated or cooled hose will also have less affect on the conditioned air flowing through it. The temperature is thermostatically controlled as described with reference to later figures.

Figure 4:
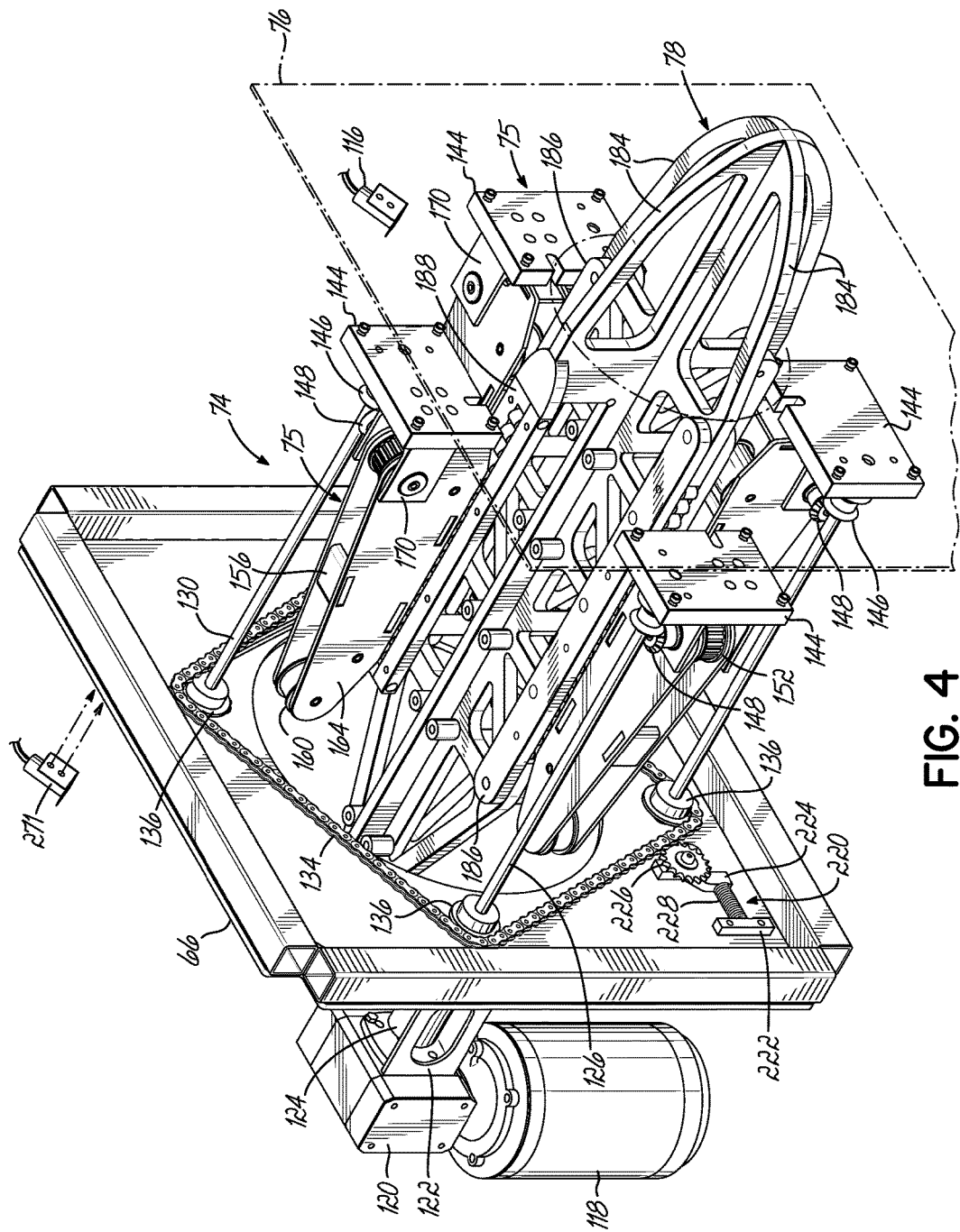
FIG. 4 illustrates an internal perspective view of the hose outlet portion of the embodiment of FIG. 1A.
Figure 12:
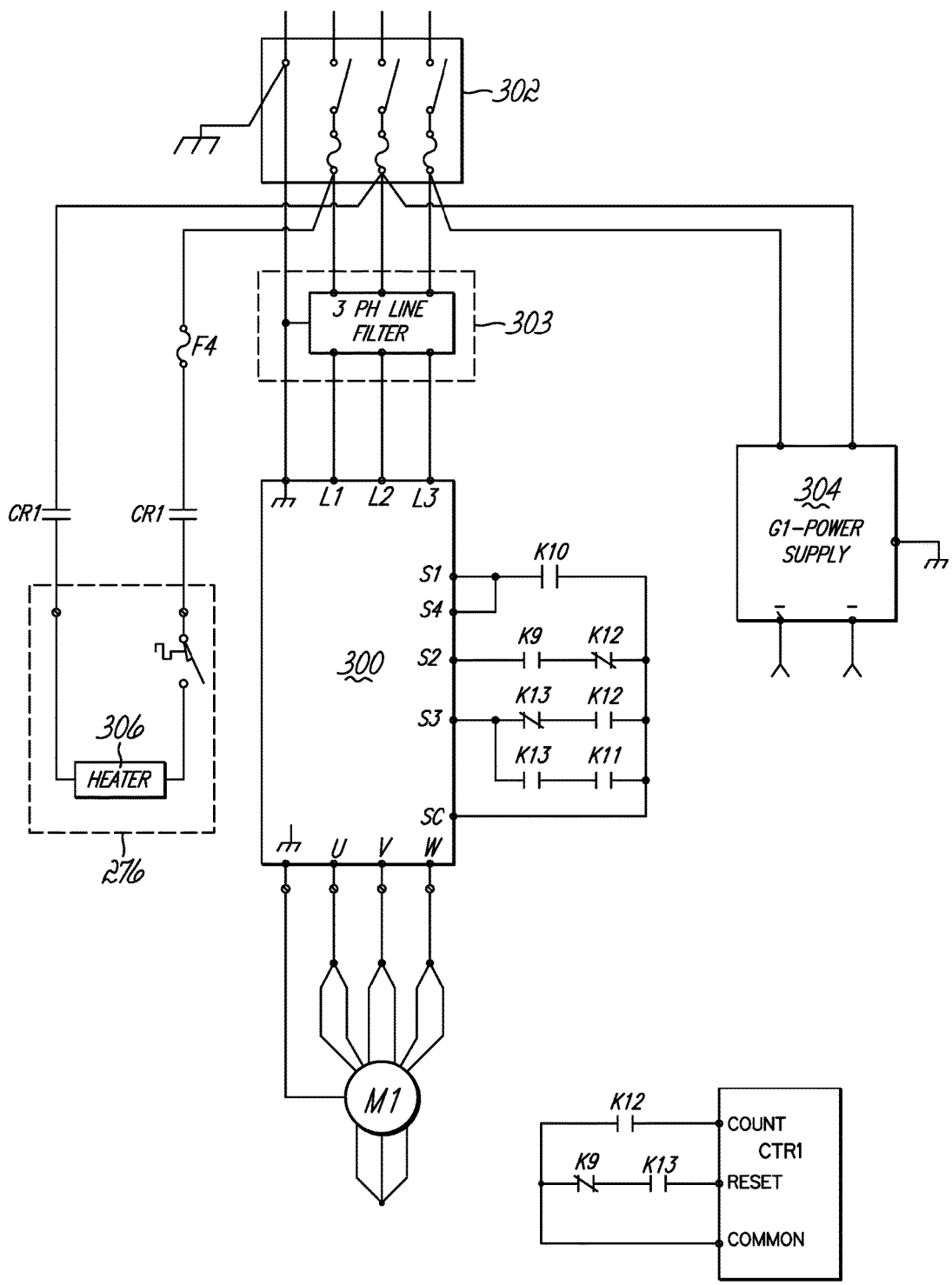
FIGS. 12, 13 and 14 are electrical schematics of the control unit controlling the operation of the embodiment of FIG. 1.

FIG. 12 is an electrical schematic of the circuitry internal to the control unit 84 of the hose retractor unit. The control unit is powered by three phase AC mains power via a fusible disconnect 302. Power from fusible disconnect 302 is coupled to a variable frequency drive circuit 300, such as a Yasakawa VFD, which supplies power to and controls the drive motor 118 which is coupled to the belt drives as shown in FIG. 4. For European installations, a three phase filter 303 may be installed between the VFD 300 and disconnect 302. Three phase power from disconnect 302 is also supplied to a +/−24 volt power supply 304 which provides electrical power to the relay logic which controls the VFD 300, which is described in detail below in connection with FIG. 13. Three phase power from disconnect 302 is further supplied to electrical resistance heater 306 via thermostatic switch 308, which collectively form the heat control element 276, which in the illustrated embodiment comprises a heater.

Figure 13:
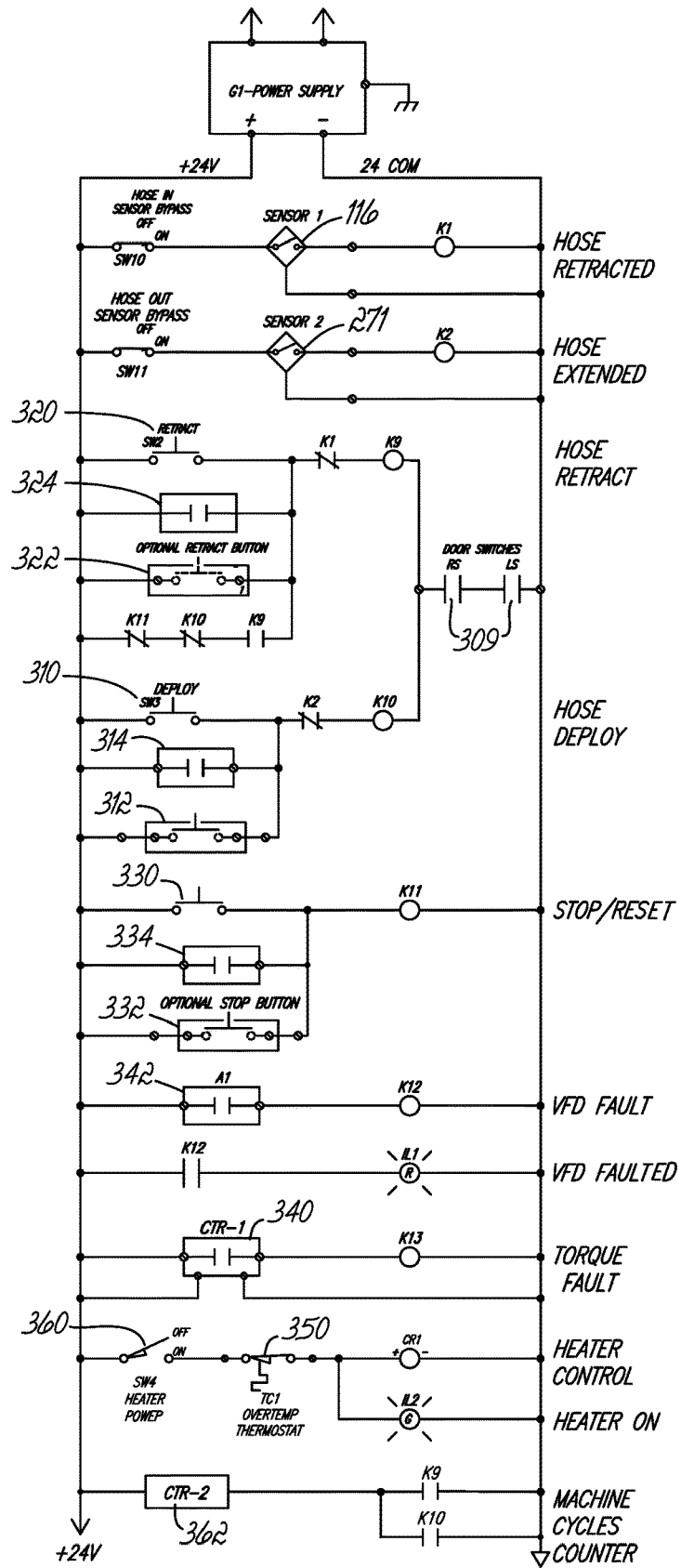

FIGS. 12 and 13 illustrate the connections to the VFD 300 which control its operation. Various fault or lock conditions are detected by this circuitry. Specifically, the doors to the interior of the compartment are equipped with contact switches 309, so that if a door is open relay power cannot be delivered to windings K9 or K10 thus defeating forward (deploy) or reverse (retract) movement of the motor 118. In addition, as previously discussed, optical sensor 116 detects full retraction of the hose and in that condition, drives relay winding K1 to open the contacts of normally closed relay K1, thus preventing any further retraction. Similarly, optical sensor 271 detects full deployment of the hose and in that condition drives relay winding K2 to open the contacts of normally closed relay K2, thus preventing any further deployment.

In the absence of any of these lockout conditions, deployment of the hose is accomplished by depressing the deploy switch 310 at the control unit, or by depressing a remote wired switch 312, or by activating a deploy button on a connected wireless remote control, which causes closure of the relay contacts 314. In the event of any of these closures, relay winding K10 is energized, causing closure of relay contacts K10 shown in FIG. 12, thus triggering VFD 300 to generate forward motion of motor 118 at a programmed speed.

In the absence of the above-noted lockout conditions, retraction of the hose is accomplished by depressing the retract switch 320 at the control unit, or by depressing a remote wired switch 322, or by activating a retract button on a connected wireless remote control, which causes closure of the relay contacts 324. In the event of any of these closures, relay winding K9 is energized, causing closure of relay contacts K9 shown in FIG. 12, thus triggering VFD 300 to generate reverse motion of motor 118 at a programmed speed.

It will be noted that a relay contact K9 is wired across the switches 320 and 322 and contacts 324, to cause a latched retraction of the hose. That is, once a retract button has been depressed, the application of power to relay winding K9 will close relay contacts K9 and thus continue the application of power to relay winding K9 until (absent other conditions noted herein) the hose is fully retracted and the operation of light sensor 116 opens relay contacts K1. Thus, the hose is fully retracted automatically without requiring continuous activation of a retract button.

The automatic retraction function noted above is conditioned in two ways. First, if the operator presses a deploy button (local to the control unit, at a wired remote location or on the wireless remote), the resulting energizing of relay winding K10 will cause normally closed relay K10 to open and interrupt current flow through the latching circuit and winding K9, opening relays K9 and discontinuing the latching function. The hose will then begin deploying, for so long as the operator continues to press the deploy button. Alternately, if the operator presses a stop button 330, a remote wired stop button 332, or a stop button on a wireless remote which controls contacts 334, relay winding K11 will be energized, causing normally closed relay K11 to open and interrupt current flow through the latching circuit and winding K9, opening relays K9 and discontinuing the latching function.

It will be noted that the VFD 300 may be programmed to deploy hose at a different speed than is used for retraction, or to deploy hose at a different speed for different applications. This may be accomplished by selectively connecting relay K10 to the forward speed selection input of the VFD 300, and similarly connecting, or not, relay K9 to a reverse speed selection input of the VFD 300.

VFD 300 may also include torque fault and self-diagnostic fault detection functions, which may be programmable or adjusted for different conditions, such as differing hose lengths, different hose diameters, or different airplane fleet sizes. Relay logic is included in FIGS. 12 and 13 to reset the VFD 300 in the event of a torque or VFD fault. Specifically it can be seen that a torque fault contact 340 from the VFD 300 is connected as shown in FIG. 13 to a relay winding K13, and a self-diagnostic fault detection contact 342 from the VFD 300 is connected as shown in FIG. 13 to a relay winding K12. Relays K12 and K13 driven by windings K12 and K13 are connected to the reset input of the VFD 300 as shown in FIG. 12 so as to reset the VFD in the event of a detected fault, so that after the operator corrects the source of the fault (e.g., a hose tangled so that retraction is prevented), use of the system can continue. A light controlled by relay contacts controlled by windings K12 or K13 may also provided on the control unit to advise the operator of the cause of the fault. (A VFD fault light is connected to a contact K12 in FIG. 13.)

A machine cycle counter 350 is included in the control unit, triggered by the deployment or retraction as indicated by closures on relay contacts controlled by windings K9 and K10.

Heater operation is also monitored within the control unit. Heater power is controlled by a switch 360, which applies power to relay winding CR1 and causes closure of relays CR1 in FIG. 12 which couple the heater circuit 276 to three phase power. An overtemperature thermostatic switch 362 connected in series with switch 360 detects overtemperature in the cabinet, indicative of a heater thermostat failure. In the event of an overtemperature condition the thermostatic switch 360 opens, de-energizing winding CR1 and preventing heater operation until the overtemperature dissipates.

Figure 14:
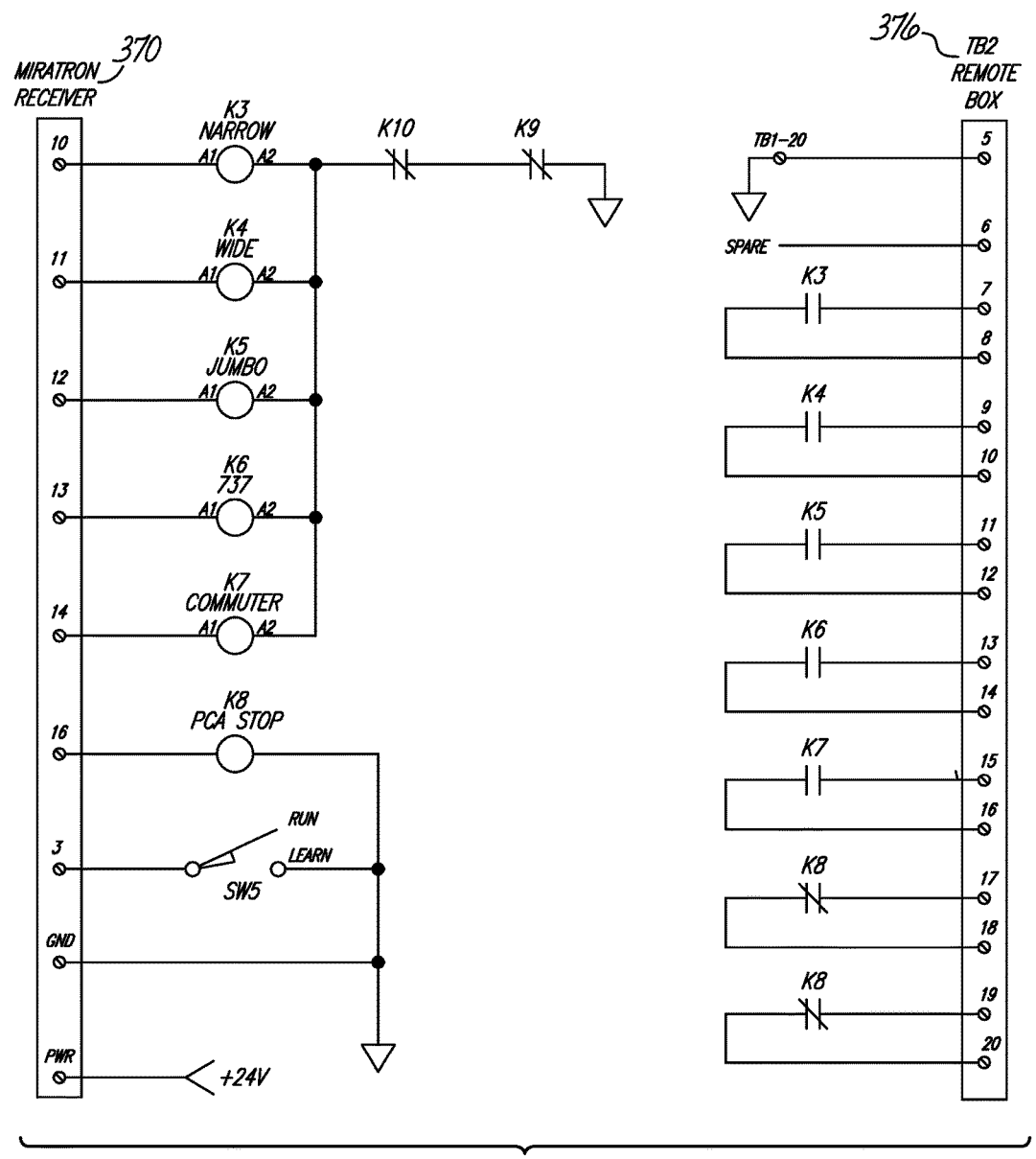

A suitable wireless remote control device providing a remote control unit and a receiver with relay contacts such as 314, 322 and 322, are sold by Miratron, 16562 SW 72nd Avenue, Portland, Oreg. As an additional feature of the device, a remote control system with multiple additional contacts may be utilized, in order to provide multiple additional control signals for other systems such as the air handler that is part of the telescoping corridor system. Thus, as seen in FIG. 14, outputs from a wireless receiver 370 are used to control a connected air handler by providing various control signals, such as signals indicating the flow rate as required by the airplane size (narrow or wide body, jumbo, 737 or commuter) or to start or stop the air handler system. The air handler is connected to a remote box 376 having therein relays K3, K4, K5, K6, K7, and two normally closed contacts K8. The relays in the remote box 376 are respectively controlled by windings K3, K4, K5, K6, K7 and K8 within the control unit, which are respectively connected to and energized by the wireless receiver.

The invention has been described herein with reference to a specific embodiment and that embodiment has been explained in substantial detail for exemplary purposes. However, the principles of the present invention are not limited to such details which have been provided for exemplary purposes.

What is claimed is:

1. An apparatus for providing conditioned air to an aircraft comprising:
   a substantially closed housing having an air inlet end, and an air outlet end;
   a longitudinally collapsible hose having an outside surface, an inlet end, and an outlet end, wherein said longitudinally collapsible hose is disposed within the housing so that the inlet end is proximate the air inlet end, and the outlet end is exterior to the air outlet end;
   a drive unit proximate the air outlet end, that contacts the outside surface of the hose to selectively push the outlet end in a first direction away from the inlet end, or pull the outlet end in a second direction towards the inlet end; and
   wherein the drive unit is mounted to the air outlet end with an adjustable mounting permitting movement of the drive unit toward and away from the outside surface of the hose to accommodate variation in the diameter of the hose, the adjustable mounting comprising a pivot connection between the drive unit and air outlet end, a shoulder bolt and tension spring, the position of the drive unit in the pivot connection being controlled by the shoulder bolt and tension spring creating force on the drive unit toward the outside surface of the hose.

2. The apparatus of claim 1 further comprising a cylindrical tube included in the housing, wherein said hose is disposed within said cylindrical tube and said cylindrical tube has perforations to allow air movement from the outside of the cylindrical tube to the inside of the cylindrical tube in contact with the hose.

3. The apparatus for providing conditioned air to an aircraft of claim 1, further comprising:
   an adjustable mounting structure compatible with an airport telescoping corridor, suspending the apparatus below the airport telescoping corridor.

4. The apparatus of claim 3 wherein the mounting structure suspends the apparatus below the airport telescoping corridor by clamping to a support structure of the airport telescoping corridor without modifying the support structure.

5. The apparatus for providing conditioned air to an aircraft of claim 1, wherein said drive unit comprises at least first and second drive shafts generating force applied to said hose, the first and second drive shafts coupled to a drive motor for common drive by the drive motor.

6. The apparatus of claim 5 further comprising third and fourth drive shafts generating force applied to said hose, the third and fourth drive shafts coupled together and to said drive motor by a drive chain.

7. The apparatus of claim 1 wherein the shoulder bolt is mounted to a spring block engaged to a slotted hole in the drive unit.

8. The apparatus for providing conditioned air to an aircraft of claim 1, wherein said drive unit comprises a drive belt matable to the outside surface of the house and generating force applied to said hose, and a drive motor applying driving force to said drive belt.

* * * * *